(12) United States Patent
Takahashi

(10) Patent No.: US 7,005,400 B2
(45) Date of Patent: Feb. 28, 2006

(54) COMPONENT OF CATALYST FOR POLYMERIZING OLEFIN, CATALYST FOR POLYMERIZING OLEFIN AND PROCESS FOR POLYMERIZING OLEFIN

(75) Inventor: Tadashi Takahashi, Mie (JP)

(73) Assignee: Japan Polychem Corporation, Tokyo (JP)

( * ) Notice: Subject to any disclaimer, the term of this patent is extended or adjusted under 35 U.S.C. 154(b) by 238 days.

(21) Appl. No.: 10/115,023

(22) Filed: Apr. 4, 2002

(65) Prior Publication Data

US 2003/0054952 A1    Mar. 20, 2003

(30) Foreign Application Priority Data

Apr. 5, 2001  (JP)  .......................... P.2001-106998

(51) Int. Cl.
B01J 31/00 (2006.01)

(52) U.S. Cl. ...................... 502/152; 502/155; 502/167; 502/503; 502/527.12; 502/527.15; 502/527.16

(58) Field of Classification Search ................ 502/152, 502/155, 167, 503, 527.12, 527.15, 527.16, 502/407, 414, 411, 263, 250, 242, 415, 341, 502/255, 351, 349, 340
See application file for complete search history.

(56) References Cited

U.S. PATENT DOCUMENTS

| | | | |
|---|---|---|---|
| 4,247,669 A | 1/1981 | Reginato et al. | |
| 4,312,967 A | 1/1982 | Norwood et al. | |
| 4,396,533 A | 8/1983 | Johnstone | |
| 5,024,982 A | 6/1991 | Hawley et al. | |
| 5,770,753 A | 6/1998 | Kuber et al. | |
| 5,786,432 A | 7/1998 | Kuber et al. | |
| 5,808,136 A | 9/1998 | Tacke et al. | |
| 5,840,644 A | 11/1998 | Kuber et al. | |
| 5,880,241 A | 3/1999 | Brookhart et al. | |
| 5,880,323 A | 3/1999 | Brookhart, III et al. | |
| 5,928,982 A | 7/1999 | Suga et al. | |
| 5,955,555 A | 9/1999 | Bennett | |
| 5,973,084 A | 10/1999 | Suga et al. | |
| 6,048,817 A | 4/2000 | Sagae et al. | |
| 6,096,801 A | 8/2000 | Vincent et al. | |
| 6,103,207 A | 8/2000 | Chattha et al. | |
| 6,214,761 B1 | 4/2001 | Bennett | |
| 6,252,097 B1 | 6/2001 | Sugano et al. | |
| 6,297,338 B1 | 10/2001 | Cotts et al. | |
| 6,309,997 B1 | 10/2001 | Fujita et al. | |
| 6,340,652 B1 | 1/2002 | Sugano et al. | |
| 6,632,894 B1 * | 10/2003 | McDaniel et al. ............ 526/89 |
| 6,649,713 B1 * | 11/2003 | Tang et al. ................. 526/160 |

FOREIGN PATENT DOCUMENTS

| | | |
|---|---|---|
| EP | 0 474 391 | 3/1992 |
| EP | 0 509 294 | 10/1992 |
| EP | 0 965 599 | 12/1999 |
| EP | 1 099 714 | 5/2001 |
| JP | 6-100579 | 4/1994 |
| JP | 07-188335 | 7/1995 |
| JP | 9-316119 | 12/1997 |
| JP | 10-226712 | 8/1998 |
| JP | 11-1660 | 1/1999 |
| JP | 11-166012 | 6/1999 |
| JP | 11-315109 | 11/1999 |
| WO | WO 94/08914 | 4/1994 |
| WO | WO 98/27124 | 8/1996 |
| WO | WO 96/23010 | 6/1998 |
| WO | WO 99/21895 | 5/1999 |
| WO | WO 01/32309 | 5/2001 |
| WO | WO 02/34390 | 5/2002 |

OTHER PUBLICATIONS

S. Srinivasan, et al., Journal of Catalysis, vol. 131, XP002208490, pp. 260-275, "The Formation of Titanium Oxide Monolayer Coatings on Silica Surfaces", 1991.
Lucia H. B. Baptistella, et al., Tetrahedron Letters, vol. 40, No. 14, XP-004160284, pp. 2695-2698, "Chromium (VI) Adsorbed on $SiO_2/ZrO_2$, A New Supported Reagent for Allylic Oxidations", Apr. 2, 1999.
Katsue Shibata, et al., "Acidic properties of Binary Metal Oxides," Bulletin of the Chemical Society of Japan, vol. 46, Oct. 1973, pp. 2985-2988.
Boris L. Moroz, et al., "Silica-supported zirconocene catalysts: Preparation, characterization and activity in ethylene polymerization," Journal of Molecular Catalysis A: Chemical 130, 1998, pp. 121-129.
George J. P. Britovsek, et al., "The Search for New-Generation Olefin Polymerization Catalysts: Life beyond Metallocenes," Angew. Chem Int. Ed. 1999, pp. 428-447.
Chandrasekhar S. Bajgur, et al., "evolution of new generation 'single-site' Ziegler-Natta polymerization catalysts," Current Science, vol. 78, No. 11, Jun. 10, 2000, pp. 1325-1335.
Shokubai Kougaku Koza 10, Shokubai Kiso Sokuteihou, p. 74, with English Translation.

(Continued)

Primary Examiner—J. A. Lorengo
Assistant Examiner—J. Pasterczyk
(74) Attorney, Agent, or Firm—Oblon, Spivak, McClelland, Maier & Neustadt, P.C.

(57) ABSTRACT

A component of a catalyst for polymerizing an olefin, comprises: a carrier containing an inorganic oxide selected from silica, alumina, zirconia and titania and having a crushing strength of 0.5 to 25 MPa; and at least one member selected from oxides or hydroxides of metals of the groups 2, 3, 4, 13 and 14 in the periodic table, the metals being different from the metal constituting the inorganic oxide in the carrier, wherein the at least one member is supported on the surface of the carrier, so as to provide a novel catalyst component suitable for particle polymerization of an olefin and enabling to easily change molecular weight distribution of the resultant polymer.

23 Claims, No Drawings

OTHER PUBLICATIONS

Shokubai Kougaku Koza 4, Shokubai Kiso Sokuteihou, p. 169 to 170, with English Translation.

Guillermo C. Bazan, et al., "Aminoboratabenzene Derivatives of Zirconium: A New Class of Olefin Polymerization Catalysts," J. Am. Chem. Soc., 1996, 118, pp. 2291-2292.

John D. Scollard, et al., "Polymerization of α-Olefins by Chelating Diamide Complexes of Titanium," Macromolecules, 1996, 29, pp. 5241-5243.

Robert Baumann, et al., "Synthesis of Titanium and Zirconium Complexes That Contain the Tridentate Diamido Ligand, [((t-Bu-d6)N-o-C6H4)20]2- ([NON]2-) and the Living Polymerization of 1-Hexene by Activated [NON]ZrMe2," J. Am. Chem. Soc., 1997, 119, pp. 2830-3831.

Lan-Chang Liang, et al., "Synthesis of Group 4 Complexes that Contain the Diamidoamine Ligands, [(2,4,6-Me3C6H2NCH2)2NR]2-; R=H or CH3), and Polymerization of 1-Hexene by Activated [Mes2N2NR]ZrMe2 Complexes," J. Am. Chem. Soc., 1999, 121, pp. 5797-5798.

Victoria Volkis, et al., "Pressure Modulates Steroregularities in the Polymerization of Propylene Promoted in the Polymerization of Propylene Promoted by rac-Octahedral Heteroallylic Complexes," Organometallics, 1998, 17, pp. 3155-3157.

Lynda K. Johnson, et al., "New Pd(II)- and Ni(II)-Bases Catalysts for Polymerization of Ethylene and α-Olefins," J. Am. Chem. Soc., 1995, 117, pp. 6414-6415.

George J. P. Britovsek, et al., "Novel olefin polymerization catalysts basedon iron and cobalt," Chem. Commun., 1998, pp. 849-850.

Brooke L. Small, et al., "Highly Active Iron and Cobalt Catalysts for the Polymerization of Ethylene," J. Am. Chem. Soc., 1998, 120, pp. 4049-4050.

* cited by examiner

COMPONENT OF CATALYST FOR POLYMERIZING OLEFIN, CATALYST FOR POLYMERIZING OLEFIN AND PROCESS FOR POLYMERIZING OLEFIN

BACKGROUND OF THE INVENTION

1. Field of the Invention

The present invention relates to a component of a catalyst for polymerizing an olefin, the catalyst for polymerizing an olefin, and a process for polymerizing an olefin.

2. Description of the Related Art

In olefin polymerization, there have been popularly used catalysts comprising a transition metal component and a co-catalyst component. In particular, catalysts wherein metallocene is used as the transition metal component have come into a wide use, because such catalysts provide a polymer showing excellent mechanical properties and thermal properties due to the excellent uniformity of the resultant polymer.

As a co-catalyst component for converting the metallocene to an activated cationic form for polymerizing an olefin, boron compounds such as $B(PhF_6)_3$, $Ph_3 CB(PhF_5)_4$ and $PhNMe_2 HB(PhF_5)_4$ are famous. However, these compounds are soluble in a solvent to be used for the olefin polymerization like the transition metal compounds, and involve the problem that they are not suited for particle-form-polymerization for producing a polymer as particles.

On the other hand, there have been made investigations on solid co-catalyst components adapted for the particle-form-polymerization and, as examples thereof, there are illustrated an example of using silica having been surface-treated with trimethylchlorosilane (Journal of Molecular Catalysis A: Chemical 130,121(1998)) and an example of using ion-exchangeable layered silicate (Japanese Patent Laid-Open No. 1660/1999). However, as far as the inventors have understood, these co-catalysts involve such problems as that they are insufficient in catalytic activity or ability of controlling molecular weight distribution of a resultant polymer, that they are seriously insufficient in controlling the form of resultant polymer particles, or that a considerable investment is required for an equipment for producing a carrier necessary therefor.

Further, it has recently been reported that novel complexes containing a central metal atom of iron, nickel, cobalt, palladium or the like as a single site catalyst in place of metallocene can be used in combination with a suitable activator for olefin polymerization (Angew. Chem. Int. Ed., 1999, p. 428, CURRENT SCIENCE 2000, p1325). Catalyst components having superior activating ability are also needed for such single site catalysts.

SUMMARY OF THE INVENTION

The present invention provides a component of a catalyst for polymerizing an olefin, which can provide a catalyst for polymerizing an olefin capable of easily changing the molecular weight distribution of a resultant polymer, which permits to suitably conduct particle-form-polymerization of the olefin, and which can be industrially obtained with ease, a catalyst for polymerizing an olefin prepared by using the component, and a process for polymerizing an olefin.

As a result of intensive investigations on an absolutely novel co-catalyst component which has an excellent performance as a carrier for a catalyst for particle-form-polymerization and which can be industrially obtained with ease, the inventor have developed a novel inorganic compound component of the catalyst which activates a transition metal compound to form cationic species.

Specifically, the invention provides a component of a catalyst for polymerizing an olefin, which comprises, supported on the surface of a carrier containing an inorganic oxide selected from among silica, alumina, zirconia and titania and having a crushing strength of 0.5 to 25 MPa, at least one member selected from among oxides or hydroxides of metals of the groups 2, 3, 4, 13 and 14 in the periodic table and different from the metal constituting the carrier oxide.

Further, the invention provides the component of a catalyst for polymerizing an olefin as described above, wherein the range:

$$-16 < pKa < +1.5$$

In addition, this invention provides the catalyst component comprising a carrier of which the average diameter of fine pores is preferably 10 to 50 nm.

Still further, the invention provides a catalyst for polymerizing an olefin, which comprises the component of a catalyst described above and a transition metal complex compound having an olefin-polymerizing ability, and provides a process for polymerizing an olefin, which comprises conducting homopolymerization or copolymerization of an olefin using the catalyst described above.

DETAILED DESCRIPTION OF THE INVENTION

<Carrier, Activator>

The component of the catalyst of the invention for polymerizing an olefin is prepared by supporting on the surface of a carrier containing an inorganic oxide selected from among silica, alumina, zirconia and titania and having a specific crushing strength, at least one member selected from among oxides or hydroxides of metals of the groups 2, 3, 4, 13 and 14 in the periodic table and different from the metal constituting the carrier inorganic oxide.

The component of the catalyst of the invention for polymerizing an olefin can provide a catalyst for polymerization enabling to easily change molecular weight distribution of a resultant olefin polymer when used in combination with a compound of a transition metal being activated cationically of the groups 4 to 10 in the periodic table and, if necessary, an organic aluminum compound, and can provide a process for producing a polyolefin.

The inorganic oxide to be used in the catalyst component, which contains silica, alumina, zirconia or titania, preferably has about a fragility with which it can be easily disintegrated by a polymer produced during polymerization, and those inorganic oxides which have a crushing strength of 0.5 to 25MPa, preferably 1 to 10 MPa, more preferably 2 to 8 MPa, are used. In addition, particle size of the primary particles constituting the carrier is preferably 20 to 500 nm, and the fine pores are formed by the gaps of the particles, with the fine pore diameter being preferably 10 to 50 nm.

As to fine pore structure, it is desired for the fine pore structure to have an enough large size so that the transition metal compound functioning as an active site for polymerization can be enough diffused and supported and so that the polymerizable monomer can be enough diffused therethrough. That is, it is preferred to have a fine pore volume of 0.5 to 2.5 cc/g and a specific surface area of 50 to 400 m²/g. Thus, average diameter of the fine pores is calculated by following formula:

diameter (nm)=4000×fine pore volume (cc/g) /specific surface area (m²/g)

A smaller fine pore volume or a larger specific surface area is not preferred because there results a seriously reduced fine pore diameter. This structure is considered to be related to the above-described particle strength. Generally speaking, the larger becomes the fine pore diameter and the fine pore volume, the less becomes the crushing strength. Such fine pore structure of the carriers can be seen through observation of the inside by means of an electron microscope (SEM).

As to the particle size, an average particle size of 5 to 100 μm is preferred in the case of conducting particle-form-polymerization, and an average particle size of 0.1 to 5 μm, which is smaller than above, is preferred in the case of conducting a solution process.

Examples of the oxides or hydroxides of at least one member selected from among oxides or hydroxides of metals of the groups 2, 3, 4, 13 and 14 in the periodic table and different from the metal constituting the carrier inorganic oxide to be supported on the surface of a carrier containing an inorganic oxide selected from among silica, alumina, zirconia and titania include oxides and hydroxides of metals selected from among Be, Mg, Ca, Zn, Cd, B, Al, Ga, Y, La, Si, Sn, Zr, Ti, etc.

The novel carrier of the invention itself functions as a carrier and, only by itself, can activate metallocene or transition metal complex compounds other than metallocene, called single site complexes having an olefin-polymerizing ability, to cause olefin polymerization.

The reason for this can be considered as follows.

That is, it is described in "Shokubai Kogaku Koza 10, Shokubai Kakuron", p. 74 that, when two metal ions different from each other in electronegativity constitute a binary oxide, they show solid acid properties with the acid strength increasing in proportion to the average electronegativity. The ability of activating metallocene may be attributed to that a solid acid is formed on the surface of silica, alumina, zirconia or titania and that the acid sites cationize metallocene. The acid strength of solid acid can easily be known by a method of using an indicator described in "Shokubai Kougaku Koza 4, Shokubai Kiso Sokuteihou", p. 169.

Inventor's investigation has revealed that, in order to cationically activate the transition metal compound, an acid strength of about pKa≦+1.5 is necessary and that a stronger acid strength permits to more reduce the temperature of activating the transition metal compound, i.e., the polymerization temperature. For example, in polymerization of ethylene, a solid acid with a comparatively weak acid strength of about +1.5 in pKa in the solution polymerization process which is conducted at above 100° C. may be used but, in the particle-form-polymerization process which is conducted at 90° C. or lower, a solid acid with an acid strength stronger than +1.5 in pKa is preferred. In the invention, the component of the catalyst has an acid strength of preferably −16<pKa<+1.5. On the other hand, in polymerization of propylene, the acid strength is preferably in the range of −16<pKa≦−5.6. In order to attain such acid strength, it is preferred to support an oxide or hydroxide of Mg, Al, Ga, Y, La, Ti or Zr on silica, support an oxide or hydroxide of B, Si, Zr or Ti on alumina, support an oxide or hydroxide of Zn, Cd, Al or Sn on titania, or support an oxide or hydroxide of Cd or the like on zirconia. In view of industrial availability, those are illustrated as preferred examples wherein silica or alumina is used as a carrier.

As the solid acids, zeolite and silica-alumina are commonly known as typical examples, but they are not suitable as carriers for a catalyst for the particle-form-polymerization process of an olefin, because they have such a large crushing strength that they are difficult to crush.

It is considered that they do not meet requirements for a catalyst for the particle-form-polymerization process wherein polymerization proceeds while diffusion of an olefin monomer is maintained through disintegration of the catalyst carrier during polymerization.

As a method for supporting an oxide or hydroxide of a different metal on the surface of silica, alumina, zirconia or titania, there are illustrated:

i) a method of supporting the above-described metal through an ion-exchanging technique in an aqueous solution of a pH capable of dissolving the metal as a salt utilizing the surface hydroxyl groups of the carrier oxide, adjusting the pH to thereby precipitate as a hydroxide and form a binary oxide or hydroxide, then calcining the product; and ii) a method of reacting the carrier oxide with a compound of the above-described metal capable of reacting with the hydroxyl group on the surface of the carrier oxide, such as a compound between the metal and an organic compound, a halogenated compound, an alkoxy compound or the like, in a solvent of a hydrocarbon, and hydrolyzing the product, followed by calcination.

Thus, there may be obtained an easily disintegratable catalyst component wherein a solid acid is formed on the surface of an easily disintegratable carrier oxide of silica, alumina, zirconia or titania. The catalyst component has a crushing strength of preferably about 0.5 to about 25MPa, more preferably about 1 to about 10 MPa, particularly preferably about 2 to about 8 MPa. In addition, particle size of the primary particles constituting the carrier is preferably 20 to 500 nm, and the fine pores are formed by the gaps of the particles, with the fine pore diameter being preferably 10 to 50 nm.

The amount of the metal compound to be supported on the surface of the inorganic oxide containing silica, alumina, zirconia or titania is fundamentally decided by the amount of hydroxyl group of the carrier surface, and the maximum amount of supported metal compound (in terms of metal; mol/m²) equals the amount of hydroxyl group on the carrier surface (mol/m²), but the amount of the metal compound may be more than the maximum amount. The amount of the supported metal compound is generally 0.1 to 15% by weight in terms of metal amount. However, as the amount increases, there results a weaker acid strength, thus the amount being preferably 0.2 to 10% by weight. The acid strength can also be controlled by selecting the combination of the carrier and the compound of the different metal, and a proper combination may be selected by reference to "Shokubai Kogaku Koza 10, Shokubai Kakuron", p. 74. After supporting the compound on the surface, the product is dried generally at 100 to 700° C., preferably at 200 to 700° C., for removing moisture on the surface which is not preferred for the transition metal compound for olefin polymerization. In view of realizing solid acid properties, the temperature for drying of 300 to 700° C. is more preferred. Drying method is not particularly limited.

[Transition Metal Compound]

As the transition metal complex compound to be used in combination with the catalyst component of the invention for polymerizing an olefin, there are illustrated cationically activatable compounds of all of the transition metals belonging to the groups 4 to 10 in the periodic table. Specific examples thereof include metallocene compounds containing a metal of one of the groups 4 to 6, bisamide compounds containing a metal of the group 4, bisimino compounds containing a metal of one of the groups 8 to 10, and salicylaldiminato compounds containing a metal of one of the groups 4 to 10.

In cases where these transition metal compounds are not dialkyl derivatives, it is necessary to allow to exist an organometallic compound containing Na, Li, Ag, Hg, Zn, Al, Ga or the like capable of converting the transition metal compounds to the dialkyl derivatives thereof prior to, or simultaneously with, the polymerization.

As transition metal compounds having at least one conjugated five-membered ring ligand and containing a metal of one of the group 4 to 6, i.e., metallocene compounds, there may be illustrated those which are represented by the following general formulae (1) to (4):

$$(C_5 H_{5-a}R^1_a)(C_5 H_{5-b}R^2_b)MXY \quad (1)$$

$$Q(C_4 H_{4-c}R^1_c)(C_5 H_{4-d}R^2_d)MXY \quad (2)$$

$$Q(C_4 H_{4-e}R^3_e)ZMXY \quad (3)$$

$$(C_5 H_{5-f}R^4_f)MXYW \quad (4)$$

In the above formulae, Q represents a binding group bridging two conjugated five-membered ring ligands, bridging one conjugated five-membered ligand and Z group, or bridging rings formed by connecting two adjacent alkyl groups on each of two conjugated five-membered rings, i.e., a hydrocarbyl group containing 1 to 20 carbon atoms or a hydrocarbyl group containing 1 to 40 carbon atoms and containing silicon, germanium, oxygen or phosphorus, M represents a metal of one of the groups 4 to 6 in the periodic table, X, Y, and W each independently represent a hydrogen atom, a halogen atom, a hydrocarbyl group containing 1 to 20 carbon atoms or a hydrocarbyl group containing 1 to 20 carbon atoms and containing oxygen, nitrogen, silicon or phosphorus, and Z represents oxygen, sulfur, or a silicon-, oxygen-, nitrogen- or phosphorus-containing hydrocarbyl group containing 1 to 40 carbon atoms. Particularly preferably, M represents Ti, Zr or Hf.

$R^1$, $R^2$, $R^3$ and $R^4$ each independently represent a hydrocarbyl group containing 1 to 20 carbon atoms, a halogen-containing hydrocarbyl group containing 1 to 20 carbon atoms, or a silicon-, phosphorus-, nitrogen-, oxygen- or boron-containing hydrocarbyl group containing 1 to 20 carbon atoms, wherein an alkoxy group, alkoxyalkyl group, aryloxy group and alkoxyaryl group are illustrated as the oxygen-containing hydrocarbyl group. When two of adjacent $R^1$, $R^2$, $R^3$ and $R^4$ are connected to each other, they may form a 4- to 10-membered ring, and a, b, c, d, e and f each represent an integer satisfying the relation of:

$$0 \leq a, b, f \leq 5, \; 0 \leq c, d, e \leq 4.$$

Of the above-described ligands, $(C_5 H_{5-a}R^1_a)$, $(C_5 H_{5-b}R^2_b)$ $(C_5 H_{4-c}R^1_c)$ and $(C_5 H_{4-d}R^2_d)$ preferably represent an indenyl group, a fluorenyl group, an azulenyl group or a partially hydrogenated azulenyl group, with those which further have substituents in 2-position and in one or more of 4 to 7 positions being particularly preferred.

The bridge-forming linking group, Q, includes an alkylene group, an alkylidene group, a silylene group or germylene group. Specific preferred examples thereof include a methylene group, an ethylene group, a dimethylsilylene group, a diphenylsililene group and a dimethylgermylen group.

Specific examples of zirconium complexes represented by the above general formulae (1) to (4) are illustrated below. Those compounds wherein zirconium is replaced by hafnium or titanium may also be similarly usable.

General Formula (1)

Biscyclopentadienylzirconium dimethyl, bis(2-methylcyclopentadienyl)zirconium dimethyl, bis(2-methyl-4,5-benzoindenyl)zirconium dimethyl, bisfluorenylzirconium dimethyl, biscyclopentadienylzirconium dichloride, bis(2-methyl-4-phenylazulenyl)zirconium dichloride, etc.

General Formula (2)

Dimethylsilylenebis(1,1'-cyclopentadienyl)zirconium dimethyl, dimethylsilylenebis (1,1'-2-methylindenyl)zirconium dimethyl, dimethylsilylenebis(1,1'-2-methyl-4,5-benzoindenyl)zirconi m dimethyl, dimethylsilylenebis(1,1'-cyclopentadienyl)zirconium dichloride, dimethylsilylenebis(1,1'-2-methyl-4,5-benzoindenyl)zirconium dichloride, dimethylsilylenebis(1,1'-2-methyl-4-phenylazulenyl)zirconium dichloride, dimethylgermylenebis(1,1'-2-methyl-4-phenylazulenyl)zirconium dichloride, dimethylsilylenebis [7,7'-{1-isopropyl-3-(4-chlorophenyl)in denyl}]zirconium dichloride, etc.

General Formula (3)

(t-Butylamido)(tetramethylcyclopentadienyl)-1,2-ethanediylzirconium dimethyl, (t-butylamido)(tetramethylcyclopentdienyl)-silanediylzirconium dimethyl, (phenylphosphido)dimethyl-(tetradimethylcyclopentadienyl) silanediylzirconiumdimethyl, (t-butylamido) (tetramethylcyclopentadienyl)-1,2-ethanediylzirconium dichloride, (t-butylamido)(tetramethyl-cyclopentadienyl) silanediylzirconium dichloride, etc.

General Formula (4)

(Cyclopentadienyl)(phenoxy)zirconium dimethyl, (2,3-dimethylcyclopentadienyl)(phenoxy)zirconium dimethyl, (pentamethylcyclopentadienyl)(phenoxy)zirconium dimethyl, (cyclopentadienyl)(phenoxy)zirconium dichloride, (2,3-dimethylcyclopentadienyl)(phenoxy)zirconium dichloride, (pentamethylcyclopentadienyl)(phenoxy)zirconium dichloride, (pentamethylcyclopentadienyl)(2,6-di-i-propylphenoxy)-zirconium dichloride, (cyclopentadienyl)zirconium chlorodimethyl, (pentamethylcyclopentadienyl)zirconium isopropoxydimethyl, (cyclopentdienyl)zirconium trichloride, (cyclopentadienyl)zirconium triisopropoxide, (pentamethyl-cyclopentadienyl)zirconium triisopropoxide, etc.

Further, as special examples of the metallocene compounds, transition metal compounds having a ligand containing one or more elements other than carbon in the 5- or 6-membered ring disclosed in Japanese Patent Laid-Open No. 188335/1995 or JACS, 1996, 118, p. 2291 are also usable.

Next, as non-metallocene compounds containing a 4-group element or an element of one of the groups 8 to 10 as a central metal, there are illustrated those bridged transition metal compounds which are represented by the following general structural formulae and wherein the central metal is directly coordinated to a nitrogen atom or an oxygen atom having a bulky substituent.

As examples of the compound containing a metal of the group 4 in the periodic table, there are illustrated the following.

(a) Those bisamido compounds which are represented by the following general formula (5) and have an N—N ligand:

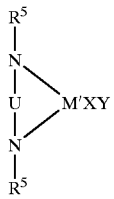

(5)

wherein $R^5$ represents a hydrocarbyl group containing 1 to 20 carbon atoms, or a halogen-,oxygen- or silicon-containing hydrocarbyl group containing 1 to 20 carbon atoms, U represents a linking group capable of bridging the two nitrogen atoms, i.e., a hydrocarbyl group containing 1 to 20 carbon atoms, or a silicon-, nitrogen-, oxygen- or sulfur-containing hydrocarbyl group containing 1 to 40 carbon atoms, M' represents a transition metal of the group 4 in the periodic table, and X and Y each represent a hydrogen atom, a halogen atom, a hydrocarbyl group containing 1 to 20 carbon atoms, or an oxygen-, nitrogen-, silicon- or phosphorus-containing hydrocarbyl group containing 1 to 20 carbon atoms.

Specifically, those wherein $R^5$ represents t-butyl, trimethylsilyl, 2,6-diisopropylphenyl, or 2,4,6-trimethylphenyl are preferred. U preferably represents propenyl, 2-phenylpropenyl, or 2,2-diphenylpropenyl. M' preferably represents Ti, Zr or Hf, and X and Y preferably represent Cl, methyl, benzyl or dimethylamido. More specifically, those wherein combination of ($R^5$, U, M', X, Y)=(t-butyl, propenyl, Ti, Cl, Cl), (trimethylsilyl, propenyl, Ti, Cl, Cl), (2,6-diisopropenylphenyl, propenyl, Ti, Cl, Cl), or (trimethylsilyl, 2-phenylpropenyl, Ti, Cl, Cl) are preferred. These compounds are disclosed in Macromolecules, 1996, p5241; JACS, 1997, 119, p3830; and JACS, 1999, 121, p5798.

(b) Those bisamidinato compounds which are represented by the following general formula (6) and have an N—N ligand:

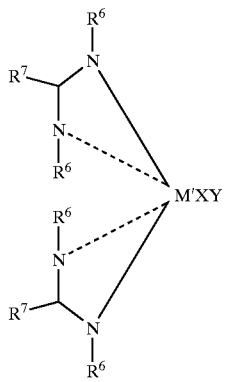

(6)

wherein $R^6$ and $R^7$ each represent a hydrocarbyl group containing 1 to 20 carbon atoms, or a halogen-, oxygen- or silicon-containing hydrocarbyl group containing 1 to 20 carbon atoms, M' represents a transition metal of the group 4 in the periodic table, and X and Y each represent a hydrogen atom, a halogen atom, a hydrocarbyl group containing 1 to 20 carbon atoms, or an oxygen-, nitrogen-, silicon- or phosphorus-containing hydrocarbyl group containing 1 to 20 carbon atoms.

Specifically, those wherein $R^6$ represents t-butyl, cyclohexyl, trimethylsilyl, 2,6-diisopropylphenyl, or 2,4,6-trimethylphenyl are preferred, and $R^7$ preferably representsmethyl, isopropyl, phenyl or p-tolyl. M' preferably represents Ti, Zr or Hf, and X and Y each preferably represent Cl, methyl, benzyl or dimethylamido.

More specifically, those wherein combination of ($R^6$, $R^7$, M', X, Y)=(t-butyl, phenyl, Zr, Cl, Cl), (trimethylsilyl, phenyl, Zr, Cl, Cl), (2,6-diisopropenylphenyl, propenyl, Ti, Cl, Cl), or (trimethylsilyl, tolyl, Zr, Cl, Cl) are preferred. These compounds are disclosed in Organometallics, 1998, p3155.

(c) Those salicylaldiminato compounds which are represented by the following general formula (7) and have an N—O ligand:

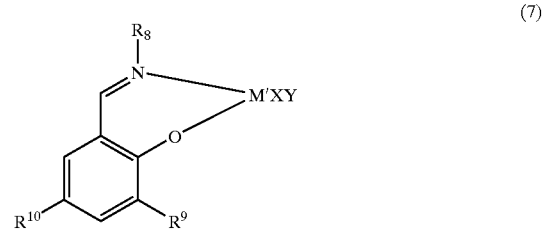

(7)

wherein $R^8$ and $R^9$ each represent a hydrocarbyl group containing 1 to 20 carbon atoms, or a halogen-, oxygen-, nitrogen-, silicon- or sulfur-containing hydrocarbyl group containing 1 to 20 carbon atoms, $R^{10}$ represents a hydrogen atom, a hydrocarbyl group containing 1 to 20 carbon atoms, or a halogen-, oxygen-, nitrogen- or silicon-containing hydrocarbyl group containing 1 to 20 carbon atoms, M' represents a transition metal of the group 4 in the periodic table, and X and Y each represent a hydrogen atom, a halogen atom, a hydrocarbyl group containing 1 to 20 carbon atoms, or an oxygen-, nitrogen-, silicon- or phosphorus-containing hydrocarbyl group containing 1 to 20 carbon atoms.

Specifically, those wherein $R^8$ represents hexyl, cyclohexyl, phenyl, tolyl, pentafluorophenyl, p-methoxyphenyl or 2,4-dimethylpyrrolyl are preferred, and $R^9$ preferably represents t-butyl or adamantyl. $R^{10}$ preferably represents a hydrogen atom, methyl, ethyl or methoxy. M' preferably represents Ti, Zr or Hf, and X and Y each preferably represent Cl, methyl, benzyl or dimethylamido.

More specifically, those wherein combination of ($R^8$, $R^9$, $R^{10}$, M', X, Y)=(cyclohexyl, t-butyl, hydrogen atom, Zr, Cl, Cl), (phenyl, t-butyl, hydrogen atom, Zr, Cl, Cl), (tolyl, t-butyl, hydrogen atom, Zr, Cl, Cl), (pentafluorophenyl, t-butyl, hydrogen atom, Zr, Cl, Cl), (pentafluorophenyl, t-butyl, hydrogen atom, Ti, Cl, Cl) or (2,5-dimethylpyrrolyl, t-butyl, hydrogen atom, Zr, Cl, Cl) are preferred. These compounds are disclosed in U.S. Pat. No. 6,309,997.

As examples of the compounds of a metal of the group 8, 9 or 10 in the periodic table, there are illustrated the following.

(a) Those bisimino compounds which are represented by the following formula (8) or (9) and have an N—N ligand:

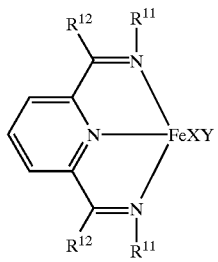

(8)

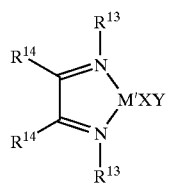

(9)

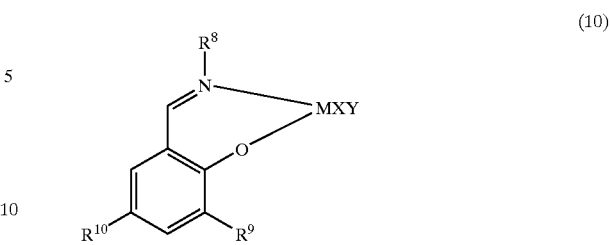

(10)

wherein $R^{11}$ and $R^{13}$ each represent a hydrocarbyl group containing 1 to 20 carbon atoms, or a halogen-, oxygen-, nitrogen-, silicon- or sulfur-containing hydrocarbyl group containing 1 to 20 atoms, $R^{12}$ and $R^{14}$ each represent a hydrogen atom, a hydrocarbyl group containing 1 to 20 carbon atoms, or a halogen-, oxygen-, nitrogen- or silicon-containing hydrocarbyl group containing 1 to 20 carbon atoms, and two $R^{14}$s may be connected each other. M' represents Ni or Pd, and X and Y each represent a hydrogen atom, a halogen atom, a hydrocarbyl group containing 1 to 20 carbon atoms, or an oxygen-, nitrogen-, silicon- or phosphorus-containing hydrocarbyl group containing 1 to 20 carbon atoms.

Specifically, those wherein $R^{11}$ represents p-tolyl, 2,6-dimethylphenyl, 2,6-diisopropylphenyl or 2,4,6-trimethylphenyl are preferred, and $R^{12}$ preferably represents a hydrogen atom, methyl, ethyl or propyl. $R^{13}$ preferably represents 2,6-dimethylphenyl, 2-t-butylphenyl or 2,6-diisopropylphenyl, and $R^{14}$ represents a hydrogen atom, methyl, ethyl, or 1,8-naphthyl, —SCH$_2$CH$_2$S— or —OCH$_2$CH$_2$O— illustrated as connected each other. M' preferably represents Ni or Pd, and X and Y each preferably represent Cl, Br, methyl or benzyl.

More specifically, those wherein combination of ($R^{11}$, $R^{12}$, X, Y)=(2,6-dimethylphenyl, hydrogen atom, Cl, Cl), (2,4,6-trimethylphenyl, hydrogen atom, Cl, Cl), (2,6-diisopropylphenyl, hydrogen atom, Cl, Cl), (p-tolyl, methyl, Cl, Cl), (2,6-dimethylphenyl, methyl, Cl, Cl) or (2,6-dimethylpyrrolyl, hydrogen atom, Cl, Cl) are preferred. Or, those wherein combination of ($R^{13}$, $R^{14}$, M', X, Y)=(2,6-dimethylphenyl, hydrogen atom, Ni, Br, Br), (2-t-butylphenyl, hydrogen atom, Ni, Br, Br), (2,6-diisopropylphenyl, hydrogen atom, Ni, Br, Br), (2,6-diisopropylphenyl, 1,8-naphthyl, Ni, Br, Br), (2,5-dimethylpyrrolyl, hydrogen atom, Ni, Br, Br) or (2,6-diisopropylphenyl, hydrogen atom, Pd, Br, Br) are preferred.

These compounds are disclosed in JACS, 1995, 117, p6414; U.S. Pat. Nos. 5,880,241 and 5,880,323; Chemical Communication, 1998, p849; JACS, 1998, 120, p4049; and U.S. Pat. Nos. 5,955,555; 6,214,761 and 6,297,338.

(b) Those salicylaldiminato compounds which are represented by the following formula (10) and have an N—O ligand:

wherein $R^8$ and $R^9$ each represent a hydrocarbyl group containing 1 to 20 carbon atoms, or a halogen-, oxygen-, nitrogen-, silicon- or sulfur-containing hydrocarbyl group containing 1 to 20 carbon atoms, $R^{10}$ represents a hydrogen atom, a hydrocarbyl group containing 1 to 20 carbon atoms, or a halogen-, oxygen-, nitrogen- or silicon-containing hydrocarbyl group containing 1 to 20 carbon atoms, M' represents Ni or Pd, and X and Y each represent a hydrogen atom, a halogen atom, a hydrocarbyl group containing 1 to 20 carbon atoms, or an oxygen-, nitrogen-, silicon- or phosphorus-containing hydrocarbyl group containing 1 to 20 carbon atoms.

Specifically, $R^8$ preferably represents hexyl, cyclohexyl, phenyl, tolyl, pentafluorophenyl, p-methoxyphenyl or pyrrolyl, $R^9$ preferably represents t-butyl or adamantyl, $R^{10}$ preferably represents a hydrogen atom, methyl, ethyl or methoxy, M' preferably represents Ni, and X and Y preferably represent Cl, methyl, benzyl or dimethylamido.

More specifically, those wherein combination of ($R^8$, $R^9$, $R^{10}$, M', X, Y)=(phenyl, t-butyl, hydrogen atom, Ni, Br, Br), (p-tolyl, t-butyl, hydrogen atom, Ni, Br, Br), (phenyl, t-butyl, hydrogen atom, Ni, Br, Br) or (2,5-dimethylpyrrolyl, t-butyl, hydrogen atom, Ni, Br, Br) are preferred.

Examples of these compounds are disclosed in U.S. Pat. No. 6,309,997.

α-olefins, cyclic olefins or dienes, such as ethylene, propylene, hexene, styrene, divinylbenzene, cyclopentene, norbornene, 1,5-hexadiene and 1,7-octadiene may be homopolymerized or copolymerized with each other by using the catalyst component and the transition metal compound.

The polymerization may be conducted according to a solvent process wherein an inert solvent of a hydrocarbon containing 3 to 30 carbon atoms or a liquefied α-olefin are used, or a gas phase polymerization process wherein substantially no solvents are used. Polymerization temperature may be employed between room temperature and 250° C. depending upon an employed process. Each of the catalyst component and the transition metal compound may be fed separately to a polymerization vessel using an inert hydrocarbon solvent, or may be previously brought into contact with each other before feeding. Further, the previously contact-treated catalyst may be washed to remove the hydrocarbon solvent-soluble transition metal compound not having been adsorbed in the contact treatment before use or, still further, the catalyst may be dried to feed as a powder. Alternatively, the catalyst may previously be brought into contact with an olefin containing 2 to 12 carbon atoms to conduct preliminary polymerization, followed by feeding into the reactor. Also, hydrogen may be used as a molecular weight-controlling agent.

The preliminary polymerization process serves to effectively adsorb the complex to the carrier component of the invention and stabilize the active sites, and improves activity per carrier, thus being a preferred process. In particular, preliminary polymerization under the conditions for the particle-form-polymerization process using ethylene or propylene is preferred.

As the conditions for the preliminary polymerization in the invention, a pressure of 0.2 to 10 kg/cm$^2$, a temperature of −20 to 90° C., and a preliminary polymerization ratio of 0.01 to 30 are preferably employed.

The invention is described more specifically by reference to Examples which, however, are not to be construed as limiting the invention. Additionally, the step of using the transition metal compound and the polymerization step described below were all conducted in an atmosphere of purified nitrogen. The solvent was deaerated by bubbling purified nitrogen thereinto, then dehydrated with MS13X before use.

EXAMPLES

Measurement of Acid Strength of Solid Acid:

The measurement was conducted according to the indicator method described in "Shokubai Kogaku Koza 4, Shokubai Kiso Sokuteiho", p169. Anthraquinone for pKa-8.2, Benzalacetophenon for −5.6, Dicinnamalacetone for −3.0 and Benzeneazodiphenylamine for +1.5 are used as indicators. The solid tested , for example, indicates acidic colour by benzalacetophenon (−5.6) and indicates basic colour by Anthraquinone(−8.2), then, the maximum acid strength of the solid is between −8.2 and −5.6. Also, crushing strength was measured according to the method described in Japanese Patent Laid-Open No. 316119/1997.

Measurement of Fine Pore Volume:

A sample was dried at 180° C. for 2 hours, then allowed to cool in a desiccator. About 5 g of the sample was weighed and placed in a 60-ml glass bottle, followed by dropwise adding thereto ion-exchanged water using a burette. The end point was when water oozed onto the surface of the sample at the bottom of the bottle. Absence of excessively added water at the end point was confirmed by turning the bottle upside down and confirming that the sample was dropped completely. The fine pore volume (cc/g) equals the amount of dropwise added water/the amount of sample (g) . The fine pore volume may also be measured by a mercury-pressurize method commonly employed in the field, and an accumulative fine pore volume of pores of not larger than 500 nm may be employed.

Measurement of Specific Area:

The measurement was conducted according to the BET method.

Example 1

500 ml of heptane, 0.49 mmol of cyclopendadienylzirconium dimethyl and 320 mg of alumina-coated silica (made by Fuji Silysia K.K.; Al: 2.2% by weight; Cariact-P10; dried at 500° C./5hrs in N$_2$; maximum acid strength pKa=−8.2 to −5.6; crushing strength: 3.6 MPa; specific surface area: 270 m$^2$/g; fine pore volume: 1.45 cc/g; average fine pore diameter: 22 nanometers; average particle size: 32.5 microns) were successively introduced into a 1.5-liter autoclave heated to 85 ° C. Subsequently, ethylene was introduced thereinto up to 7 kg/cm$^2$ G, and polymerization was conducted for 120 minutes at a constant pressure. Thus, there was obtained 0.94 g of a polymer. The polymer had a Mn of 67,000, a Mw of 335,000, and a Q value of 5.0. The polymer particles showed replica polymerization and were of a spherical shape like the carrier. Observation of inside of the polymer particles by means of an electron microscope (TEM) revealed that the carrier particles were disintegrated into sub-micron fine particles and dispersed within the resultant polymer particles, thus the effect of easily disintegratable carrier being realized.

Comparative Example 1

Polymerization of ethylene was conducted absolutely in the same manner as in Example 1 except for changing the activator to non-treated silica (made by Fuji Silysia K.K.; Cariact-P10; dried at 500° C./5 hrs in N$_2$; maximum acid strength pKa=+4.8 to +1.5; crushing strength: 3.3 MPa; specific surface area: 282 m$_2$/g; fine pore volume: 1.62 cc/g; average fine pore diameter: 23 nanometers; average particle size: 46 microns) No polymer was obtained.

Examples 2 to 5

Polymerization of ethylene was conducted absolutely in the same manner as in Example 1 except for changing the reaction conditions as shown in Table 1. Results thus obtained are tabulated in Table 1.

TABLE 1 (A)

| Example | Complex | Activator | Maximum Acid Strength[1] pKa | Crushing Strength[2] MPa | Time min |
|---|---|---|---|---|---|
| 1 | CPZM | Al-coated silica | −8.2 to −5.6 | 3.6 | 120 |
| 2 | MCZM[3] | Al-coated silica | −8.2 to −5.6 | 3.6 | 87 |
| 3 | BCHM | Al-coated silica | −8.2 to −5.6 | 3.6 | 87 |
| 4 | SIHM | Ti-coated Silica[4] | −8.2 to −5.6 | 4.6 | 180 |
| 5 | SIHM | Mg-coated Silica[5] | −3.0 to +1.5 | 5.2 | 120 |

TABLE 1(B)

| Example | Yield g | Mn × 10$^4$ | Mw × 10$^4$ | Q Value |
|---|---|---|---|---|
| 1 | 0.94 | 6.7 | 33.5 | 5.0 |
| 2 | 0.55 | 3.8 | 12.66 | 3.3 |
| 3 | 0.65 | 2.43 | 42.17 | 17.4 |
| 4 | 1.3 | 10.77 | 87.01 | 8.1 |
| 5 | 3.9 | 2.35 | 50.03 | 21.3 |

Complexes:
CPZM: cyclopentadienylzirconium dimethyl
MCZM: bis(methylcyclopentadienyl)zirconium dimethyl
BCHM: bis(n-butylcyclopentadienyl)hafnium dimethyl
SIHM: rac-dimethylsilylenebisindenylhafnium dimethyl Order of Addition
   heptane→complex→activator→(N,N-dimethyl-aniline)→ethylene
1): The acid strength of the solid acid was measured according to the indicator method described in Shokubai Kogaku Koza 4, Shokubai Kiso Sokuteiho, p169.
2): The crushing strength was measured according to the method described in Japanese Patent Laid-Open No. 316119/1997.
3): 0.25 mmol of N,N-dimethylaniline was added to the polymerization system.

4): Titania-coated silica (made by Fuji Silysia K.K.; Ti: 7.6% by weight; Cariact-P10; dried at 500° C./5 hrs in $N_2$; specific surface area: 266 m$^2$/g; fine pore volume: 1.46 cc/g; average fine pore diameter: 22 nanometers; average particle size: 48 microns)

5): Magnesia-coated silica (made by Fuji Silysia K.K.; Mg: 2.2% by weight; Cariact-P10; dried at 500° C./5 hrs in $N_2$; specific surface area: 271 m$^2$/g; fine pore volume: 1.19 cc/g; average fine pore diameter: 18 nanometers; average particle size: 48 microns)

As is described above, the novel solid oxide carriers of the invention have themselves the ability of activating metallocene dimethyl to polymerize an olefin.

Examples 6 to 11

Polymerization of ethylene was conducted in absolutely the same manner as in Example 1 except for introducing 70 mg of an organoaluminum compound before introducing the complex and changing the conditions as shown in Table 2.

Also in Example 8, copolymerization of ethylene and hexene was conducted in absolutely the same manner as in Example 1 except for introducing hexene-1 together with ethylene into the reaction system.

Results thus obtained are shown in Table 2.

TABLE 2 (A)

| Example | Complex | mmol | Activator | Organo-aluminum | Hexene ml | Time min |
|---|---|---|---|---|---|---|
| 6 | BCH | 0.011 | Al-coated | TEA | | 104 |
| 7 | BCZ | 0.011 | Al-coated | TEA | | 104 |
| 8 | BCZ | 0.011 | Al-coated | TEA | 10 | 104 |
| 9 | BCH | 0.011 | Ti-coated | TEA | | 180 |
| 10 | BCZ | 0.011 | Ti-coated | TEA | | 180 |
| 11 | MCZM | 0.011 | Ti-coated | TEA | | 180 |

TABLE 2(B)

| Example | Yield g | Mn × 10$^4$ | Mw × 10$^4$ | Q Value | DSC ° C. |
|---|---|---|---|---|---|
| 6 | 1.5 | — | — | — | |
| 7 | 1.2 | 5.94 | 17.13 | 2.88 | |
| 8 | 3.6 | 4.0 | 12.17 | 3.04 | 125 |
| 9 | 5.8 | 2.73 | 97.21 | 35.61 | |
| 10 | 8.2 | 11.31 | 72.22 | 6.39 | |
| 11 | 9.6 | 5.43 | 63.81 | 11.35 | |

Complexes:
BCH: bis(n-butylcyclopentadienyl)hafnium dichloride
BCZ: bis(n-butylcyclopentadienyl)zirconium dichloride
MCZM: bis(methylcyclopentadienyl)zirconium dimethyl Order of Addition:
heptane→Al→complex→activator→ethylene, hexene (pressed into the reaction system together with ethylene)

Example 12

(1) Preliminary Polymerization of Ethylene 380 ml of heptane, 2.28 g of TEA (as a solution in 32.6 ml heptane) and 10 g of alumina-coated silica (the same as used in Example 1) were added under stirring to a 1.5-liter autoclave heated to 40° C. in an atmosphere of nitrogen. After 10 minutes, 0.97 g of bis (n-butylcyclopentadienyl) Zr dichloride (as a solution in 94.3 ml of n-heptane) was added thereto, and immediately the temperature was raised to 80° C. An ethylene gas was fed for 40 minutes at a rate of 0.6 liter per minute. Then, feeding of the ethylene gas was discontinued and, at the same temperature, remaining polymerization was continued for 30 minutes. Then, the reaction mixture was cooled to 40° C. and the pressure was released, followed by taking out the slurry in an atmosphere of nitrogen. The product was washed by decantation with heptane so that the amount of the supernatant became 1/100. After removal of the supernatant, the product was dried under reduced pressure at 60° C. for 2 hours. Thus, 40 g of a preliminarily polymerized catalyst was recovered (preliminary polymerization activity=4.0). The Zr content was 2.4 mg Zr per g of the preliminarily polymerized catalyst (0.24% by weight Zr).

(2) Polymerization of Ethylene 500 ml of heptane, 70 mg of TIBA as an organoaluminum compound (as a solution in 0.49 ml of heptane), and 500 mg of the preliminarily polymerized catalyst (in terms of alumina-coated silica) were successively added in an atmosphere of nitrogen to 1.5-liter autoclave heated to 85° C. under stirring. Subsequently, ethylene was introduced thereinto up to 7 kg/cm$^2$, followed by conducting polymerization at a constant pressure for 120 minutes. Thus, there was obtained 61.8 g of a polymer. The catalyst showed an activity of 124 g polymer per g of the alumina-coated silica, and an activity of 4700 g polymer per mmol-complex.

Example 13

Preliminary Polymerization of Propylene 500 ml of toluene, 2.97 g of TiBA (as a solution in 21 ml of heptane) and 10 g of alumina-coated silica (the same as used in Example 1) were added under stirring to a 20° C., 1.5-liter autoclave in an atmosphere of nitrogen. After 10 minutes, 112 mg of rac-dimethylsilylenebis (2-methyl-4-phenylazulenyl) Zr dichloride (synthesized by the method described in Example 1 of U.S. Pat. Nos. 6,252,097 and 6,340,652) (as a solution in 44.9 ml of toluene) was added thereto, and immediately the temperature was raised to 500° C. A propylene gas was fed for 62 minutes at a rate of 0.17 liter per minute. Then, feeding of the propylene gas was discontinued and, at the same temperature, remaining polymerization was continued for 180 minutes. Then, the reaction mixture was cooled to 40° C. and the pressure was released, followed by taking out the slurry in an atmosphere of nitrogen. The product was washed by decantation with heptane so that the amount of the supernatant became 1/100. After removal of the supernatant, 200 mg of TiBA was added to the product for stable storage, then the product was dried under reduced pressure at 40° C. for 2 hours. Thus, 27.2 g of a preliminarily polymerized catalyst was recovered (preliminary polymerization activity 2.72). The Zr content was 0.35 mg Zr per g of the preliminarily polymerized catalyst (0.035% by weight Zr).

(2) Polymerization of Propylene 500 ml of heptane, 70 mg of TiBA as an organoaluminum compound (as a solution in 0.49 ml of heptane), and 500 mg of the preliminarily polymerized catalyst in terms of alumina-coated silica (a slurry in 18.7 ml of heptane) were successively added in an atmosphere of nitrogen to 1.5-liter autoclave heated to 60° C. under stirring. After introducing thereinto 100 ml of hydrogen, propylene was introduced thereinto up to 5 kg/cm$^2$, followed by conducting polymerization at a constant pressure for 93 minutes. Thus, there was obtained 20.1 g of a particulate polymer. The catalyst showed an activity of 40 per g of the alumina-coated silica, and an activity of 10500 g polymer per mmol-complex. The polymer had Mn of 11700, Mw of 30700, and a melting point of 149.5° C.

Example 14

500 ml of heptane, 80 mg of TEA as an organoaluminum compound (as a solution in 1.15 ml of heptane), 0.0167 mmol of rac-dimethylsilylenebis(2-methyl-4-phenylazulenyl) Zr dichloride as a complex (as a solution in 5 cc of toluene), and 500 mg of alumina-coated silica (the same as used in Example 1) as an activator were successively added in an atmosphere of nitrogen to 1.5-liter autoclave heated to 60° C. under stirring. After introducing thereinto 100 ml of hydrogen, propylene was introduced thereinto up to 5 kg/cm$^2$, followed by conducting polymerization at a constant pressure for 93 minutes. Thus, there was obtained 26.9 g of a particulate polymer. The catalyst showed an activity of 54 g polymer per g of the alumina-coated silica and an activity of 1600 g polymer per mmol-complex.

Example 15

Polymerization of propylene was conducted in absolutely the same manner as in Example 14 except for changing the complex from rac-dimethylsilylenebis(2-methyl-4-phenylazulenyl)Zr dichloride to 0.022 mmol of rac-dimethylsilylenebis(2-methyl-4-phenylindenyl)Zr dichloride (synthesized according to the method described in Example A of U.S. Pat. Nos. 5,770,753; 5,786,432; and 5,840,644) (as a solution in 2.6 ml of toluene), the organoaluminum compound from TEA to 140 mg of TiBA, and the amount of alumina-coated silica from 500 mg to 320 mg. Thus, there was obtained 2 g of a particulate polymer. The catalyst showed an activity of 6 g polymer per g of the alumina-coated silica and an activity of 91 g polymer per mmol-complex. The polymer had a melting point of 156.9° C.

Example 16

500 ml of toluene, 80 mg of TEA as the organoaluminum compound (as a solution in 1.15 ml of heptane), 0.022 mmol of bis(N,N'-bis (trimethylsilyl) benzamidinato)Zr dichloride (made by Nitia Kagaku K.K.) (as a solution in 7.6 ml of toluene) and 500 mg of alumina-coated silica (the same as used in Example 1) were successively introduced into a 1.5-liter autoclave heated to 85° C. Subsequently, ethylene was introduced thereinto up to 7 kg/cm$^2$G, and polymerization was conducted for 120 minutes at a constant pressure. Thus, there was obtained 1.2 g of a particulate polymer. The catalyst showed an activity of 2.4 g polymer per g of the alumina-coated silica and an activity of 55 g polymer per mmol-complex. The resultant polymer had a Mn of 73,800, a Mw of 828,000.

Example 17

Polymerization of ethylene was conducted in absolutely the same manner as in Example 16 except for changing the complex from cis-bis(N,N'-bis(trimethylsilyl)benzamidinato)Zr dichloride to 2,6-bis(2,6-diisopropylbenziminoethylene-pyridine Fe dichloride (made by Nichia Kagaku K.K.). Thus, there was obtained 3.3 g of a particulate polymer. The catalyst showed an activity of 6.6 g polymer per g of the alumina-coated silica and an activity of 150 g polymer per mmol-complex. The polymer had Mn of 3,900 and Mw of 36,200.

Conditions and results of the polymerization are tabulated in Tables 3 and 4, respectively.

TABLE 3 (A)

| Example | Complex | mmol | Activator | mg | Organic Al | mg |
|---|---|---|---|---|---|---|
| 12 | BCZ | 0.013 | Al-coated | 500 | TiBA | 70 |
| 13 | AzZ | 0.0019 | Al-coated | 500 | TiBA | 70 |
| 14 | AzZ | 0.017 | Al-coated | 500 | TEA | 80 |
| 15 | PIN | 0.022 | Al-coated | 320 | TiBA | 140 |
| 16 | SBAZ | 0.022 | Al-coated | 500 | TEA | 80 |
| 17 | PBIF | 0.022 | Al-coated | 500 | TEA | 80 |

TABLE 3(B)

| Example | Monomer | Pressure kg-a/cm$^2$ | H$_2$ V % | Temp. ° C. | Time min |
|---|---|---|---|---|---|
| 12 | ethylene | 7 |  | 85 | 120 |
| 13 | propylene | 5 | 2 | 60 | 93 |
| 14 | propylene | 5 | 2 | 60 | 93 |
| 15 | propylene | 5 | 2 | 60 | 93 |
| 16 | ethylene | 7 |  | 85 | 120 |
| 17 | ethylene | 7 |  | 85 | 120 |

BCZ: bis(n-butylcyclopentadienyl) Zr dichloride
AzZ: rac-dimethylsilylenebis(2-methyl-4-phenylazulenyl) Zr dichloride
PIN: rac -dimethylsilylenebis(2-methyl-4-phenylindenyl) Zr dichloride
SBAZ: cis-bis(N,N-bis(trimethylsilyl)benzamidinato) Zr dichloride
PBIF: 2,6-bis(2,6-diisopropylbenziminoethylene)pyridine) Fe dichloride

TABLE 4 (A)

| Example of | Complex | Activator | Monomer | Yield g | Activity of Activator* |
|---|---|---|---|---|---|
| 12 | BCZ | Al-coated | ethylene | 61.8 | 124 |
| 13 | AzZ | Al-coated | propylene | 20.1 | 40 |
| 14 | AzZ | Al-coated | propylene | 26.9 | 54 |
| 15 | PIN | Al-coated | propylene | 2.0 | 6 |
| 16 | SBAZ | Al-coated | ethylene | 1.2 | 2.4 |
| 17 | PBTF | Al-coated | ethylene | 3.3 | 6.6 |

TABLE 4(B)

| Example | Activity of Complex** | Mn × 10$^4$ | Mw × 10$^4$ | Q Value | DSC mp ° C. |
|---|---|---|---|---|---|
| 12 | 4700 |  |  |  |  |
| 13 | 10500 | 1.17 | 3.07 | 2.62 | 149.5 |
| 14 | 1600 |  |  |  |  |
| 15 | 91 |  |  |  | 156.9 |
| 16 | 55 | 7.38 | 82.8 | 11.2 |  |
| 17 | 150 | 0.39 | 3.62 | 9.28 |  |

**: g-polymer/mmol-complex

This application is based on Japanese patent application JP 2001-106998, filed Apr. 5, 2001, the entire content of which is hereby incorporated by reference, the same as if set forth at length.

What is claimed is:
1. A catalyst for polymerizing an olefin, which comprises:
   a transition metal complex compound having an olefin-polymerizing ability;
   wherein the transition metal complex compound is selected from the group consisting of a metallocene compound comprising a group 4 metal, a bisamide compound comprising a group 4 metal, and a salicylaldiminato compound comprising a metal from any one of groups 4 to 10; and a co-catalyst comprising
an elemental hydroxide supported on a surface of a carrier comprising an elemental oxide,
wherein said element of the elemental oxide is selected from the group consisting of Si, Al, Zr, and Ti;
wherein said carrier has a crushing strength of 0.5 to 25 MPa; and
wherein the element of the elemental hydroxide is different from the element of the elemental oxide of the carrier, and is selected from the group consisting of Be, Mg, Ca, Zn, Cd, B, Al, Ga, Y, La, Si, Sn, Zr, Ti, and combinations thereof.

2. A catalyst for polymerizing an olefin as claimed in claim 1, wherein the element of the elemental oxide of the carrier is Al and the element of the elemental hydroxide is selected from the group consisting of B, Si, Zr, Ti, and combinations thereof.

3. A catalyst for polymerizing an olefin as claimed in claim 1, wherein the element of the elemental oxide of the carrier is Si and the element of the elemental hydroxide is selected from the group consisting of Mg, Al, Ga, Y, La, Ti, Zr, and combinations thereof.

4. A catalyst for polymerizing an olefin as claimed in claim 1, wherein the transition metal complex compound having an olefin-polymerizing ability comprises a bisamide compound comprising a group 4 metal.

5. A catalyst for polymerizing an olefin as claimed in claim 1, wherein the transition metal complex compound having an olefin-polymerizing ability comprises a metallocene compound comprising a group 4 metal.

6. A catalyst for polymerizing an olefin as claimed in claim 1, wherein the transition metal complex compound having an olefin-polymerizing ability comprises a salicylaldiminato compound comprising a metal of any one of the groups 4 to 10.

7. A catalyst for polymerizing an olefin as claimed in claim 4, wherein the co-catalyst has an acid strength pKa in the following range:

$-16 < pKa < +1.5$.

8. A catalyst for polymerizing an olefin as claimed in claim 1, wherein the co-catalyst has an acid strength pKa in the following range:

$-16 < pKa \leq -5.6$.

9. A catalyst for polymerizing an olefin as claimed in claim 1, wherein the co-catalyst has an average fine pore diameter of 10 to 50 nm.

10. A catalyst for polymerizing an olefin as claimed in claim 1, wherein the co-catalyst has a fine pore volume of 0.5 to 2.5 cc/g.

11. A catalyst for polymerizing an olefin as claimed in claim 1, wherein the co-catalyst has a specific surface area of 50 to 400 $m^2/g$.

12. A catalyst for polymerizing an olefin as claimed in claim 1, wherein the carrier has a crushing strength of 1 to 10 MPa.

13. A catalyst for polymerizing an olefin as claimed in claim 1, wherein the carrier has a crushing strength of 2 to 8 MPa.

14. A catalyst for polymerizing an olefin, which comprises:
a transition metal complex compound having an olefin-polymerizing ability;
wherein the transition metal complex compound having an olefin-polymerizing ability comprises a bisimino compound comprising a metal of one of the groups 8 to 10;
a co-catalyst comprising
an elemental hydroxide supported on a surface of a carrier comprising an elemental oxide,
wherein said element of the elemental oxide is selected from the group consisting of Si, Al, Zr, and Ti; and
wherein said carrier has a crushing strength of 0.5 to 25 MPa; and
wherein the element of the elemental hydroxide is different from the element of the elemental oxide of the carrier, and is selected from the group consisting of Be, Mg, Ca, Zn, Cd, B, Al, Ga, Y, La, Si, Sn, Zr, Ti, and combinations thereof; and
wherein the elemental oxide-hydroxide supported on the surface of the carrier is obtained by a process comprising an ion-exchanging technique in an aqueous solution.

15. A catalyst for polymerizing an olefin as claimed in claim 14, wherein the co-catalyst has an acid strength pKa in the following range:

$-16 < pKa < +1.5$.

16. A catalyst for polymerizing an olefin as claimed in claim 14, wherein the co-catalyst has an acid strength pKa in the following range:

$-16 < pKa \leq -5.6$.

17. A catalyst for polymerizing an olefin as claimed in claim 14, wherein the co-catalyst has an average fine pore diameter of 10 to 50 nm.

18. A catalyst for polymerizing an olefin as claimed in claim 14, wherein the co-catalyst has a fine pore volume of 0.5 to 2.5 cc/g.

19. A catalyst for polymerizing an olefin as claimed in claim 14, wherein the co-catalyst has a specific surface area of 50 to 400 $m^2/g$.

20. A catalyst for polymerizing an olefin as claimed in claim 14, wherein the carrier has a crushing strength of 1 to 10 MPa.

21. A catalyst for polymerizing an olefin as claimed in claim 15, wherein the carrier has a crushing strength of 2 to 8 MPa.

22. A catalyst for polymerizing an olefin as claimed in claim 14, wherein the element of the elemental oxide of the carrier is Si and the element of the elemental hydroxide is selected from the group consisting of Mg, Al, Ga, Y, La, Ti, Zr, and combinations thereof.

23. A catalyst for polymerizing an olefin as claimed in claim 14, wherein the element of the elemental oxide of the carrier is Al and the element of the elemental hydroxide is selected from the group consisting of B, Si, Zr, Ti, and combinations thereof.

* * * * *